(12) United States Patent
Li et al.

(10) Patent No.: US 8,881,152 B2
(45) Date of Patent: Nov. 4, 2014

(54) WORKING SETS OF SUB-APPLICATION PROGRAMS OF APPLICATION PROGRAMS CURRENTLY RUNNING ON COMPUTING SYSTEM

(75) Inventors: Yongcheng Li, Cary, NC (US); Al Chakra, Apex, NC (US); Yuping C. Wu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 13/174,678

(22) Filed: Jun. 30, 2011

(65) Prior Publication Data
US 2013/0007746 A1    Jan. 3, 2013

(51) Int. Cl.
G06F 9/46      (2006.01)
G06F 3/048    (2013.01)
G06F 9/48      (2006.01)

(52) U.S. Cl.
CPC .................................. *G06F 9/4843* (2013.01)
USPC ........................................ 718/100; 715/810

(58) Field of Classification Search
None
See application file for complete search history.

(56) References Cited

U.S. PATENT DOCUMENTS

| 8,171,425 B2 * | 5/2012 | Song et al. ..................... 715/810 |
| 2005/0223334 A1 | 10/2005 | Guido et al. |
| 2008/0005693 A1 | 1/2008 | Oliver |
| 2008/0034317 A1 | 2/2008 | Fard |

OTHER PUBLICATIONS

"Tab Groups," Firefox extension, accessed from Internet Jun. 30, 2011.
Wikipedia entry "Compiz," en.wikipedia.org, no later than Mar. 30, 2007.
Wikipedia entry "Expose (Mac OSX X)," en.wikipedia.org, no later than Jun. 23, 2003.

\* cited by examiner

*Primary Examiner* — Kenneth Tang
(74) *Attorney, Agent, or Firm* — Diana Roberts

(57) ABSTRACT

A pattern corresponds to a task that a computing system can perform. The pattern at least indirectly identifies one or more sub-application programs of one or more application programs that the computing system can run and that are relevant to the task. Application of the pattern to sub-application programs of application programs currently running on the computing system identifies a working set of one or more sub-application programs of one or more application programs currently running on the computing system and that are relevant to the task. The computing system hides, within a graphical user interface that the computing system presents, the sub-application programs of the application programs currently running on the computing system that are not part of the working set, and the application programs currently running on the computing system that do not include any sub-application program that is part of the working set.

18 Claims, 4 Drawing Sheets

WORKING SETS OF SUB-APPLICATION PROGRAMS OF APPLICATION PROGRAMS CURRENTLY RUNNING ON COMPUTING SYSTEM

BACKGROUND

Users can use computing systems, like computing devices such as laptop and desktop computers, to perform and complete tasks in their personal and work lives. Modern computing systems afford users the ability to run a number of application programs at the same time, which permits the users to employ different application programs to complete tasks. For instance, a user working on a work project may have an email messaging program, a calendaring program, a word processing program, a presentation program, and a web browsing program open and running on his or her computer at the same time, all of which the user employs in varying degrees to complete the work project.

SUMMARY

A method of an embodiment of the disclosure includes defining a pattern corresponding to a task performable on a computing system. The pattern at least indirectly identifies one or more sub-application programs of one or more application programs that the computing system can run and that are relevant to the task. The method includes a processor applying the pattern to sub-application programs of application programs currently running on the computing system to identify a working set of one or more sub-application programs of one or more application programs currently running on the computing system that are relevant to the task. The method includes the processor hiding (a) the sub-application programs of the application programs currently running on the computing system that are not part of the working set, within a graphical user interface that the computing system presents. The processor also hides (b) the application programs currently running on the computing system that do not include any sub-application program that is part of the working set, within the graphical user interface that the computing system presents.

A computing system of an embodiment of the disclosure includes a processor, and a computer-readable data storage medium. The computer-readable data storage medium stores an operating system that the processor executes to provide a graphical user interface. The computer-readable data storage medium stores sub-application programs of application programs that the processor can execute. The computer-readable data storage medium stores a computer program that the processor executes. The computer program applies a pattern corresponding to a task that the computing system runs to the sub-application programs of the application programs currently running on the computing system, to identify a working set of one or more sub-application programs of one or more application programs currently running on the computing system that are relevant to the task. The pattern least indirectly identifies one or more sub-application programs of one or more application programs that the computing system can run and that are relevant to the task. The computer program hides, within the graphical user interface, (a) the sub-application programs of the application programs currently running on the computing system that are not part of the working set. The computer program also hides, within the graphical user interface, (b) the application programs currently running on the computing system that do not include any sub-application program that is part of the working set.

A computer program product of an embodiment of the disclosure includes a computer-readable storage medium embodying computer-readable code. A processor of a computing system, which provides a graphical user interface, executes the computer-readable code. The computer-readable code includes first computer-readable code to apply a pattern corresponding to a task that the computing system can perform to sub-application programs of the application programs currently running on the computing system, to identify a working set of one or more sub-application programs of one or more application programs currently running on the computing system. The working set includes those sub-application programs that are relevant to the task. The pattern at least indirectly identifies one or more sub-application programs of one or more application programs that the computing system can run and that are relevant to the task. The computer-readable code includes second computer-readable code to hide, within the graphical user interface, (a) the sub-application programs of the application programs currently running on the computing system that are not part of the working set. The second computer-readable code is also to hide, within the graphical user interface, (b) the application programs currently running on the computing system that do not include any sub-application program that is part of the working set.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
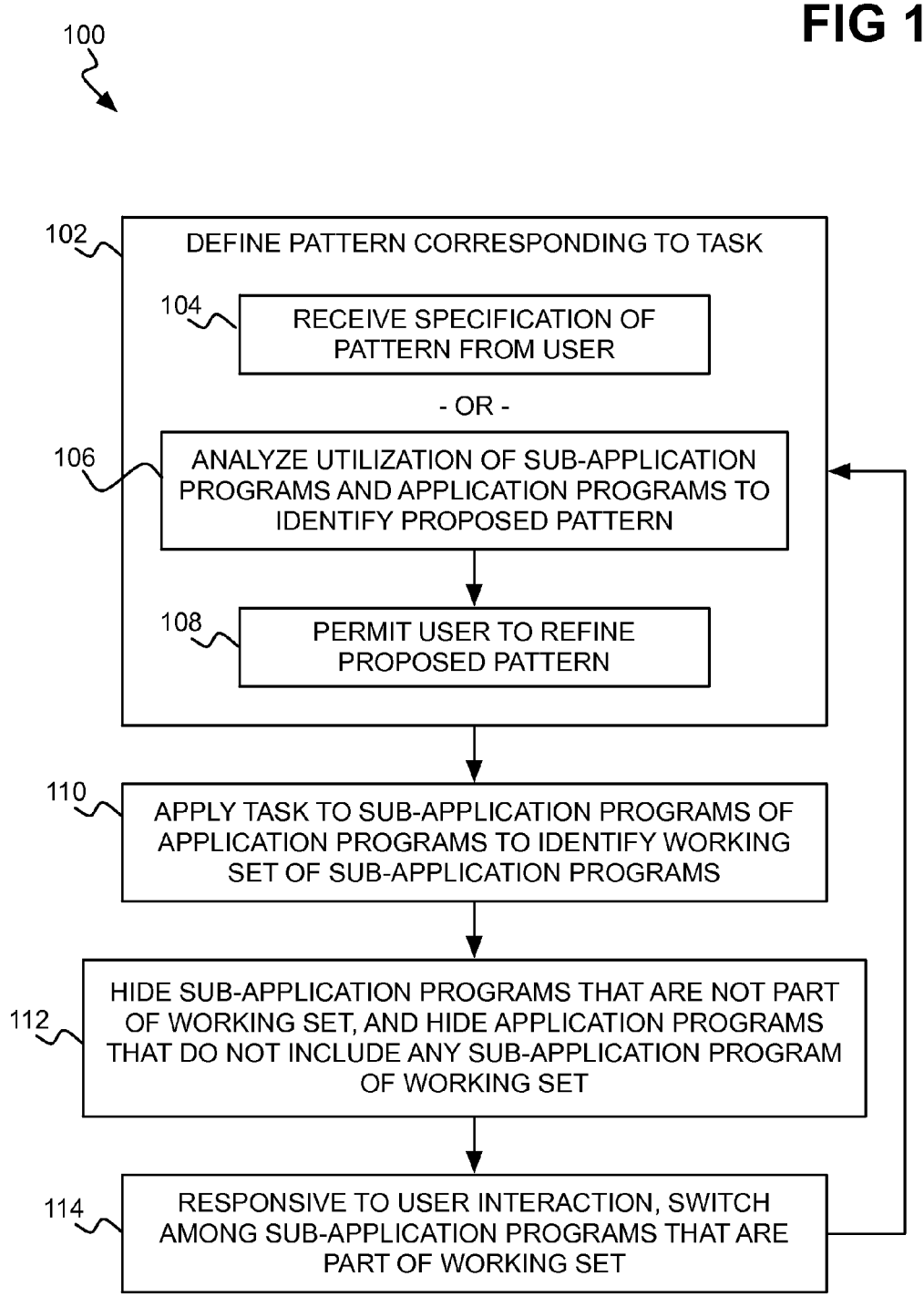
FIG. 1 is a flowchart of a method, according to an embodiment of the present disclosure.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, a user may employ a number of different application programs on a computing system like a computing device to complete a task. The user him or herself, however, may be multi-tasking, such that the user has a number of application programs open on the computing system. Some application programs may be relevant to some tasks the user is currently completing, other application programs may be relevant to other tasks the user is currently completing, and still other application programs may be relevant to multiple tasks the user is currently completing.

Application programs have sub-application programs. A sub-application program of an application program corresponds to one or more of the following. First, the sub-application program can correspond to a separately and currently open tab of a window of an application program. Second, the sub-application program can correspond to a separately and currently open window of an application program. Third, the sub-application program can correspond to a separately and currently open document of an application program. Fourth, the sub-application program can correspond to a separately and currently open file of the application program. Fifth, the sub-application program can correspond to a separately and currently open item, such as an email, and so on, of the application program.

A user can encounter a difficulty when completing multiple tasks that use different sub-application programs of application programs. This difficulty is switching among the sub-application programs that are germane to a particular task. For instance, a user may be currently working on an email within an email messaging program, where the email relates to a task. The user may want to switch to a document window of a word processing program, where the document window relates to the task as well. However, the word processing program may have a number of different document windows open, some of which do not relate to the current task of the user.

As such, the user may have to switch past unrelated document windows before arriving at the document window that relates to the current task. The user may also have to switch past application programs that do not have any sub-application programs relevant to the current task at hand, before arriving at a sub-application program of an application program that is relevant to the current task at hand. Where the user has a large number of sub-application programs of a large number of application programs currently running, and which relate to a number of different tasks, user productivity can thus suffer.

Techniques disclosed herein improve user productivity in this respect. An embodiment of the disclosure defines a pattern that corresponds to a task that a computing system can perform. The pattern at least indirectly identifies one or more sub-application programs of one or more application programs that the computing system can run and that are relevant to the task. The embodiment applies the pattern to the sub-application programs of the application programs currently running on the computing system. The result is the identification of a working set of one or more sub-application programs of one or more application programs currently running on the computing system that are relevant to the user's task at hand.

The embodiment hides, within a graphical user interface that the computing system presents, sub-application programs of application programs currently running on the computing system that are not part of the working set. By comparison, the embodiment does not hide within the graphical user interface the sub-application programs of these application programs that are part of the working set. The embodiment likewise hides within the graphical user interface the application programs currently running on the computing system that do not include any sub-application program that is part of the working set. As such, when a user switches among sub-application programs and application programs by interacting with the graphical user interface, switching occurs among just the sub-application programs that are part of the working set. This is because the embodiment has hidden unrelated sub-application programs and unrelated application programs.

FIG. 1 shows a method 100, according to an embodiment of the disclosure. A processor of a computing system can implement parts of the method 100. For instance, the processor may execute a computer program that a computer-readable data storage medium stores to perform the method 100.

The processor can define a pattern corresponding to a task that a computing system can perform (102). A task is a project or other type of task that a user is to complete or work on using the computing system. The pattern at least indirectly identifies one or more sub-application programs of one or more application programs that the computing system can run and that are relevant to the task. In one embodiment, the pattern can directly identify these sub-application programs, whereas in another embodiment, the pattern just indirectly identifies these sub-application programs.

The processor can define the pattern in part 102 in different embodiments by performing part 104, or by performing parts 106 and 108. First, processor can receive a specification of the pattern from the user (104). In this respect, the user specifies the pattern, either by directly or indirectly identifying the sub-application programs of the application programs that the computing system can run or that are running on the computing system and that are relevant to the task. In the latter case, in which the pattern indirectly identifies the sub-application programs of the application programs that are relevant to the task, the pattern may be defined as follows.

The processor may receive a description of first criteria that each sub-application program that is relevant to the task is to explicitly include. These first criteria can be "hard" criteria. For example, a user may specify tabs of web browsing programs that are open to web pages having universal resource locator (URL) addresses that contain a particular phrase.

Additionally or alternatively, the processor may receive a description of second criteria to which each sub-application program that is relevant to the task relates. This second criteria can be "soft" criteria. For example, a user may specify tabs of web browsing programs that are open to web pages that relate to a particular phrase, regardless of whether or not the URL addresses of these web pages or the content of these web pages explicitly recite the particular phrase. In this respect, the processor may employ semantic analysis techniques to determine whether this second criteria encompass a given web browsing program tab.

Additionally or alternatively, the processor may receive a description of third criteria that completely and concretely define the pattern. For example, a user may specify sub-application programs of application programs that explicitly recite or that semantically relate to a particular category. In this respect, these third criteria can include or encompass the first and second criteria that have been described.

Additionally or alternatively, the processor may receive a description of fourth criteria that just abstractly define the pattern, but that completely and concretely defines the pattern in accordance with a pattern. For example, a user may specify sub-application programs of application programs that explicitly recite or that semantically relate to a category, where the category itself remains unspecified until the processor has received a supplied parameter. As such, these fourth criteria are similar to the third criteria, but are different in that the third criteria particularly specify the category, for instance, whereas the fourth criteria do not until the processor has received a supplied parameter.

The processor can also define the pattern, second, by performing parts 106 and 108. The processor may analyze utilization of sub-application programs and application programs that are currently running or that have been running on the computing system to identify a proposed pattern that is relevant to the task at hand (106). The processor may then permit the user to refine the proposed pattern so that the processor defines the pattern as the user desires (108).

For example, a user may specify that for the current day, the user has been working on a particular task using his or her computing system. As such, the processor may analyze the sub-application programs and the application programs that the user employed to work on this task, to identify a proposed pattern, which the processor may identify pursuant to any of the four criteria described above, for instance. The processor may perform semantic and other forms of analysis to determine the commonality of these sub-application programs and application programs in order to generate a proposed pattern that is relevant to the task at hand. The processor then affords the user an opportunity to refine the proposed pattern, such as the proposed criteria, to ensure that the processor accurately defines the end result pattern.

The processor can define patterns in other ways as well. For instance, the processor may combine two existing patterns to define a new pattern. As one example of this type of pattern definition, the processor may define a first pattern pursuant to part 104 or to parts 106 and 108 as above. The processor may define a second pattern in such a way that it just specifies a time constraint, such as any sub-application program of any application program with which the user has interacted over a particular time period. The processor thus may define a third pattern by combining these two patterns.

The processor applies the pattern to the sub-application programs of the application programs currently running on a computing system to identify a working set (110). The working set encompasses the sub-application programs that are relevant to the task at hand. The sub-application programs of the working set are part of application programs currently running on the computing system. The processor achieves application of the pattern by comparing the criteria that the pattern specifies, for instance, to each sub-application program of each application program currently running on the computing system.

Figure 2:
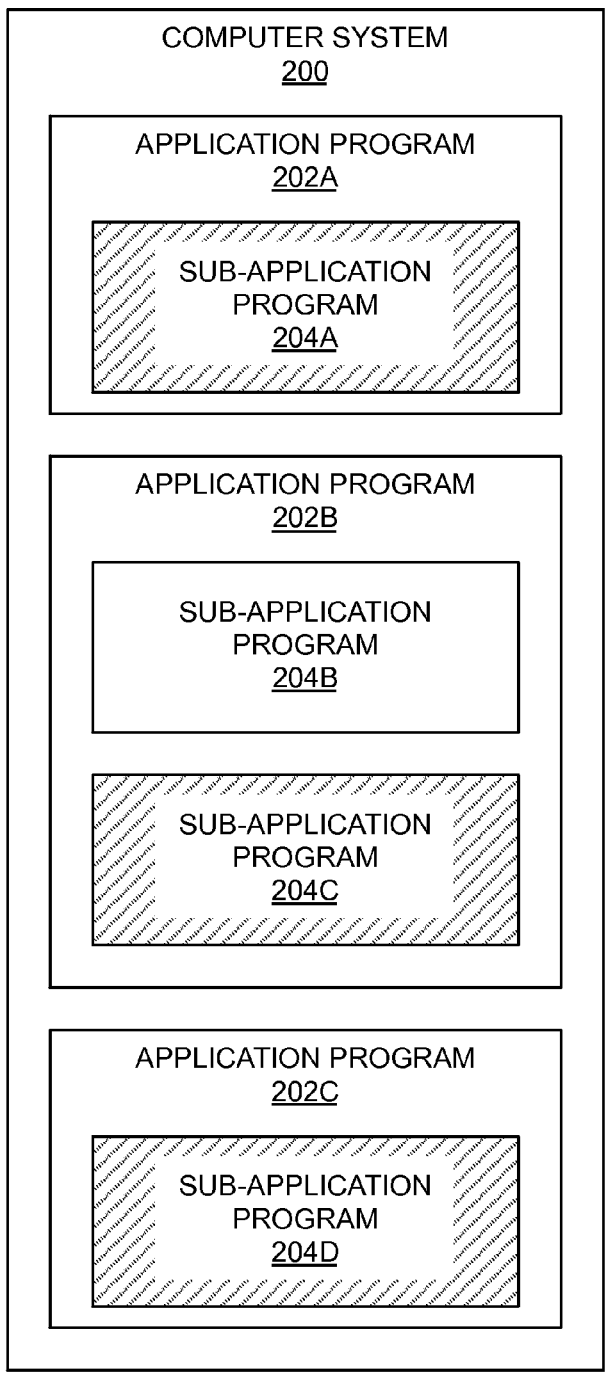
FIG. 2 is a diagram of a computing system in relation to which the detailed description describes example performance of a part of the method of FIG. 1, according to an embodiment of the present disclosure.

FIG. 2 shows an example computing system 200 that illustrates performance of part 110 of the method 100, according to an embodiment of the disclosure. The computing system 200 includes three application programs 202A, 202B, and 202C, collectively referred to as the application programs 202, currently running thereon. The application programs 202 include sub-application programs 204A, 204B, 204C, and 204D, which are collectively referred to as the sub-application programs 204.

Specifically, the sub-application program 204A is part of the application program 202A, the sub-application programs 204B and 204C are part of the application program 202B, and the sub-application program 204D is part of the application program 202C. An application program 202 has at least one sub-application program 204. Each sub-application program 204 may relate to zero or more tasks.

Application of a particular pattern to the sub-application programs 204 of the application programs 202 may result in a working set 206 of the sub-application programs 204A and 204C as being relevant to the task to which the pattern corresponds. These sub-application programs 204A and 204C are shaded in FIG. 2. Therefore, all the sub-application programs 204 of the application program 202A—i.e., the sole sub-application program 204A of the application program 202A—are part of the working set 206.

Furthermore, of the two sub-application programs 204B and 204C of the application program 202B, just the sub-application program 204C—and not the sub-application program 204B—is part of the working set 206. By comparison, none of the sub-application programs 204 of the application program 202D is part of the working set 206. That is, the sole sub-application program 204D of the application program 202B is not part of the working set 206.

Referring back to FIG. 1, the processor hides sub-application programs that are not part of the working set within a graphical user interface that the computing system presents (112). More specifically, the processor hides within the graphical user interface the sub-application programs of the application programs currently running on the computing system that are not part of the working set, such that the processor does not hide the sub-application programs of these application programs that are part of the working set. Furthermore, the processor hides within the graphical user interface the application programs currently running on the computing system that do not include any sub-application program that is part of the working set.

In response to user interaction, the processor switches among the sub-application programs that are part of the working set (114). The processor does not permit switching, however, among the sub-application programs that are not part of the working set. The processor also does not permit switching among the application programs that do not include any sub-application program that is part of the working set.

Figure 3A:
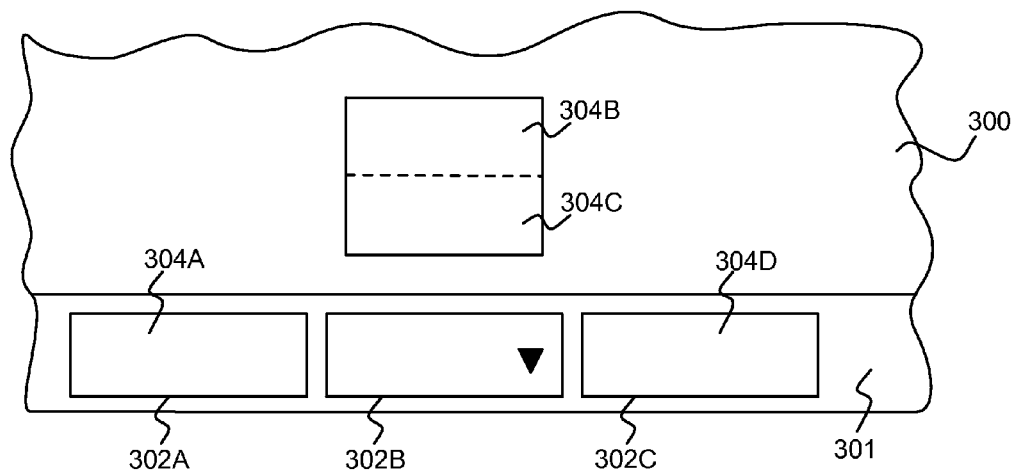
FIGS. 3A and 3B are diagrams of a graphical user interface in relation to which the detailed description describes example performance of parts of the method of FIG. 1, according to an embodiment of the present disclosure.
Figure 3B:
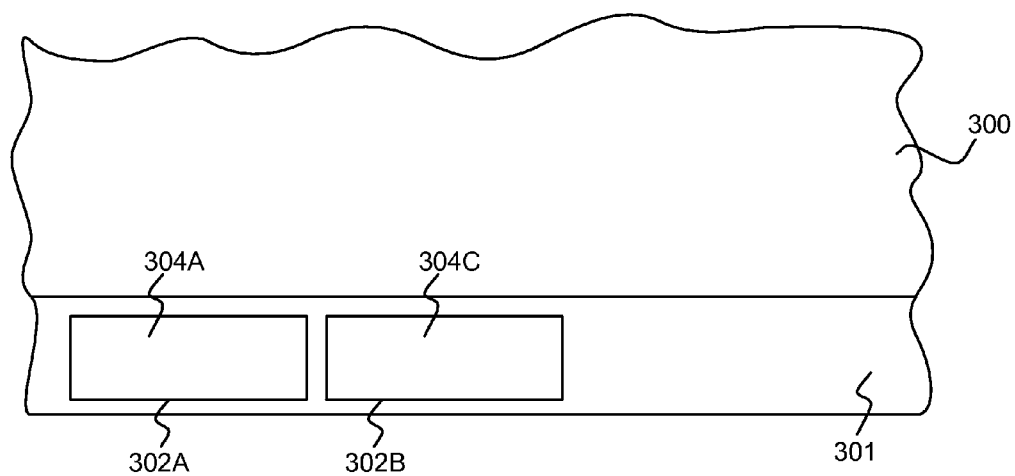

FIGS. 3A and 3B show a portion of an example graphical user interface 300 that illustrates performance of parts 112 and 114 of the method 100, according to an embodiment of the disclosure. FIG. 3A shows the example graphical user interface 300 for the application programs 202 of FIG. 2 prior to performance of part 112. FIG. 3B shows the example graphical user interface 300 for the application programs 202 subsequent to performance of part 112.

Referring first to FIG. 3A, the graphical user interface 300 includes a region 301, such as a bar or dock that may be located at the bottom of the graphical user interface 300. The region 301 includes graphical elements 302A, 302B, and 302C, collectively referred to as the graphical elements 302, which correspond to the application programs 202. The graphical elements 302 may be buttons that the user can select to switch among the application programs 202.

For the application programs 202A and 202C that include just one sub-application program 204 each, the graphical elements 302A and 302C can be graphical elements 304A and 304D corresponding to the sub-application programs 204A and 204D. The sub-application program 204A of the application program 202A thus corresponds to the graphical element 304A. Likewise, the sub-application program 204D of the application program 202C corresponds to the graphical element 304D. Selecting the graphical elements 302A/304A and 302D/304D brings up the sub-application programs 204A and 204D of the application programs 202A and 202C, respectively.

However, for the application program 202B that includes multiple sub-application programs 204B and 204C, there are separate graphical elements 304B and 304C corresponding to the sub-applications 204B and 204C, respectively. Selecting the graphical element 302B may bring up the graphical elements 304B and 304C, from which the user can then select either graphical element 304B or 304C to bring up sub-application 204B or 204C, respectively. Prior to selection of the graphical element 302B, the graphical elements 304B and 304C may be hidden. The graphical elements 304B and 304C may be buttons.

In FIG. 3A, prior to performance of part 112 of the method 100, the processor permits display of all the graphical elements 302 of the application programs 202 currently running on the computing system 200 and all the graphical elements 304 of the sub-application programs 204 currently running on the computing system 200. The processor permits the user to switch among all the sub-application programs 204. For instance, the user can select a graphical element 302 and/or 304 corresponding to a desired application program 202 and/or sub-application program 204. The processor may permit the user to use an appropriate keyboard shortcut, such as by pressing the tab key while holding down a modifier key like a control key or a command key, to switch among the sub-application programs 204 and/or the application programs 202.

Referring next to FIG. 3B, after performing part 112 of the method 100, the processor displays just the graphical elements 302 and 304 corresponding to the sub-application program 204A of the application program 202A and to the sub-application program 204B of the application program 202B that are part of the working set 206 within the region 301 of the graphical user interface 300. Therefore, for the application program 202A having a sole sub-application program 204A that is within the working set 206, the processor displays the graphical element 302A/304A in FIG. 3B, as in FIG. 3A. For the application program 202C having a sole sub-application program 204D that is not within the working set 206, the processor does not display the graphical element 302C/304D in FIG. 3B, unlike in FIG. 3A.

For the application program 202B having one sub-application program 204B that is not within the working set 206 and another sub-application program 204C that is within the working set 206, the processor still displays the graphical element 302B within the region 301 of the graphical user interface 300 in FIG. 3B. The processor hides the graphical element 304B for the sub-application program 204B in FIG. 3B, whereas the processor does not hide the graphical element 304C for the sub-application program 204C in FIG. 3B. Because the application program 202B has just one sub-application program 204D that is within the working set 206, the graphical element 304C has become the graphical element 302B in FIG. 3B, and is not a separate graphical element as it was in FIG. 3A.

The processor has not closed or shutdown the application program 202C, its sub-application program 204D, and the sub-application program 204C of the application program 202B after performance of part 112 of the method 100. Rather, the processor has simply hidden them within the graphical user interface 300 in FIG. 3B. For instance, the processor may simply hide the windows for the application program 202C, its sub-application program 204D, and the sub-application program 204C of the application program 202B, within the graphical user interface 300.

Furthermore, when the user switches among sub-application programs 204 and/or application programs 202 in accordance with part 114 of the method 100, after the processor has performed part 112, the processor permits the user to just switch between and select the sub-application program 204A of the application program 202A and the sub-application program 204C of the application program 202B. The processor does not permit the user to switch among and select the sub-application program 204B of the application program 202B and the application program 202C including the sub-application program 204D. This is because the working set does not include the sub-application programs 204B and 204D.

For instance, because the processor has hidden the graphical elements 304B and 302C/304D in FIG. 3B, the user cannot select either such element by moving an on-screen pointer over the element and selecting the element to select the corresponding sub-application program or application program. Furthermore, when the user uses a keyboard shortcut to switch among currently running sub-application programs and/or currently running application programs, the processor does not include and thus does not make available the sub-application program 204B of the application program 202B and the application program 202C including the sub-application program 204D. Rather, the user can just switch between and select the sub-application programs 204A and 204C of the application programs 202A and 202B, respectively, which are part of the working set 206.

Referring back to FIG. 1, the processor can repeat the method 100 at part 102, as indicated by part 116, to define a second pattern in relation to a second task, in addition to the first pattern in relation to the first task as has been described. The processor can apply the second pattern in part 110 in one of two ways. First, the processor can apply the second pattern to the previously identified working set to identify a sub-working set of the sub-application programs of the application programs currently running on the computing system that are relevant to both the first and second tasks. As such, in part 112, the processor hides the sub-application programs that are not part of the sub-working set, and the application programs that do not include any sub-application program that is not part of the sub-working set.

Second, the processor can apply the second pattern to the sub-application programs of the application programs currently running on the computing system in part 110, no differently than the first pattern was as described above. As such, the processor identifies a new, second working set of the sub-application programs of the application programs currently running on the computing system that are relevant to the second task, regardless of whether any of these sub-application programs are relevant to the first task or not. In part 112, then, the processor hides the sub-application programs that are not part of the second working set, and the application programs that do not include any sub-application program that is not part of the second working set.

The processor may permit the user to define, edit, and delete patterns and working sets as desired, after the initial definition of each such pattern in part 102 and the identification of each such working set in part 110. The processor can apply third, fourth, and fifth patterns, and so on, to previously identified (sub-)working sets to further refine these working sets, in the same manner that the processor can apply a second pattern to the working set identified via application of the first pattern as described above. Similarly, the processor can apply third, fourth, and fifth patterns, and so on, to the sub-application programs of the application programs currently running on the computing system to define new third, fourth, and fifth working sets, and so on, as well, in the same manner that the processor can apply a second pattern to identify a second working set as described above.

Figure 4:
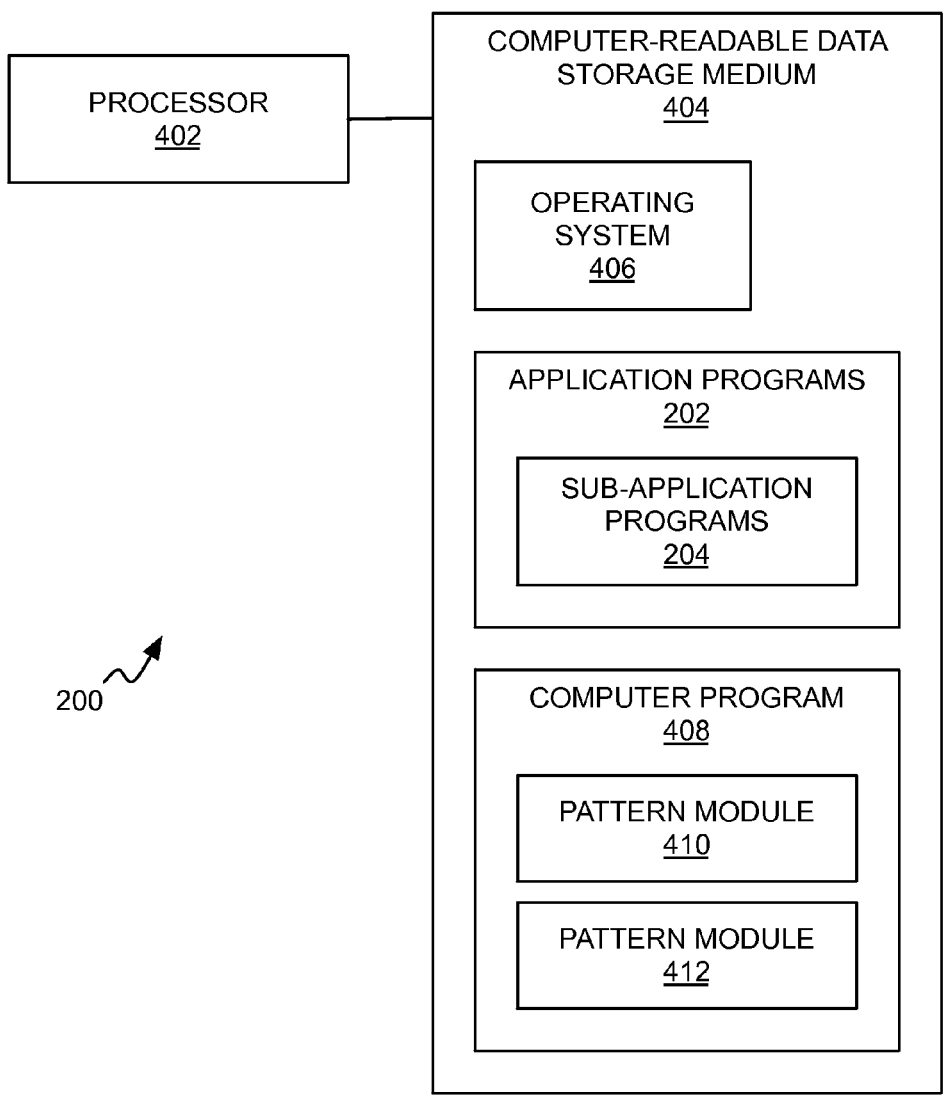
FIG. 4 is a diagram of a computing system, according to an embodiment of the present disclosure.

FIG. 4 shows the computing system 200 in representative detail, according to an embodiment of the disclosure. A computing device, like a desktop or a laptop computer, can implement the computing system 200. The computing system 200 includes a processor 402 and a computer-readable data storage medium 404. Examples of the latter include volatile and non-volatile magnetic media, semiconductor media, optical media, and so on.

The computer-readable data storage medium 404 includes an operating system 406, the application programs 202 and their sub-application programs 204, and a computer program 408. The processor 402 can execute (i.e., implement) the operating system 406, the application programs 202 and their sub-application programs 204, and the computer program 408 from the computer-readable data storage medium 404. The operating system 406 presents or provides a graphical user interface. The processor 402 executes the application programs 202 and their sub-application programs 204, and the computer program 408 in accordance with and/or within the operating system 406.

The computer program 408 may be a part of the operating system 406 or may be separate from the operating system 406. The computer program 408 can in one embodiment include two different modules 410 and 412, each of which computer-readable code implements. The pattern module 410 performs the pattern-related functionality of the method 100 that has been described, such as parts 102, 104, 106, 108, and/or 110. The hiding module 412 by comparison performs the hiding and switching functionality of the method 100 that has been described, such as parts 112 and 114.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processor of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A computer-implemented method comprising:
    defining a pattern corresponding to a task performable on a computing system, the pattern at least indirectly identifying one or more sub-application programs of one or more application programs that can be run on the computing system and that are relevant to the task;
    applying the pattern, by a processor, to a plurality of sub-application programs of a plurality of application programs currently running on the computing system to identify a working set of one or more sub-application programs of one or more application programs currently running on the computing system that are relevant to the task;
    hiding, by the processor, (a) the plurality of sub-application programs of the plurality of application programs currently running on the computing system that are not part of the working set, and (b) the plurality of application programs currently running on the computing system that do not include any sub-application program that is part of the working set, within a graphical user interface presented by the computing system; and
    responsive to a user interacting with the graphical user interface to switch among the sub-application programs currently running on the computing system, switching, by the processor, among the sub-application programs that are part of the working set,
    wherein a given application program of the one or more application programs includes a first sub-application program relevant to the task and a second sub-application program not relevant to the task, the processor hiding the second sub-application program of the given application program but not the first sub-application program of the given application program.

2. The method of claim 1, wherein each sub-application program corresponds to one or more of:
    a separately and currently open tab of a window of a corresponding application program;
    a separately and currently open window of a corresponding application program;
    a separately and currently open document of a corresponding application program;
    a separately and currently open file of a corresponding application program;
    a separately and currently open item of a corresponding application program.

3. The method of claim 1, wherein defining the pattern comprises:
    receiving a specification of the pattern, by the processor, from a user, without the user specifying the working set itself.

4. The method of claim 3, wherein receiving the specification of the pattern from the user comprises one or more of:
    receiving a description of first criteria that is to be explicitly included in each sub-application program that is relevant to the task;
    receiving a description of second criteria to which each sub-application program that is relevant to the task is related;
    receiving a description of third criteria that completely and concretely defines the pattern;
    receiving a description of fourth criteria that generally and abstractly defines the pattern, and that completely and concretely defines the pattern in accordance with a parameter.

5. The method of claim 1, wherein defining the pattern comprises:
    analyzing, by the processor, utilization of the sub-application programs and the application programs that one or more of are running and have been running on the computing system to identify a proposed pattern that is relevant to the task;
    permitting, by the processor, refinement of the proposed pattern, by the user, to generate the pattern from the proposed pattern.

6. The method of claim 1, wherein the graphical user interface comprises a region in which the plurality of application programs currently running on the computing system are identified by graphical elements,
    and wherein hiding the plurality of sub-application programs that are not part of the working set and the plurality of application programs that do not include any sub-application program that is part of the working set comprises:
        hiding the graphical elements for the application programs that do not include any sub-application program that is part of the working set.

7. The method of claim 1, wherein the graphical user interface comprises a region in which the plurality of sub-application programs of the plurality of application programs currently running on the computing system are identified by graphical elements,
    and wherein hiding the plurality of sub-application programs that are not part of the working set and the plurality of application programs that do not include any sub-application program that is part of the working set comprises:
        hiding the graphical elements for the sub-application programs that are not part of the working set.

8. The method of claim 1, wherein the pattern is a first pattern corresponding to a first task and at least indirectly identifies one or more first sub-application programs of one or more second application programs that are relevant to the first task, and the method further comprises:
    defining a second pattern corresponding to a second task performable on a computing system, the second pattern at least indirectly identifying one or more second sub-application programs of one or more second application programs that can be run on the computing system and that are relevant to the second task;

applying the second pattern, by the processor, to the working set to identify a sub-working set of the working set of the one or more sub-application programs of the one or more application programs currently running on the computing system that are relevant to both the second task in addition to being relevant to the second task;

hiding, by the processor, (a) the plurality of sub-application programs of the plurality of application programs currently running on the computing system that are not part of the sub-working set, and (b) the plurality of application programs currently running on the computing system that do not include any sub-application program that is part of the sub-working set, within the graphical user interface.

9. The method of claim 1, wherein the working set is a first working set, the pattern is a first pattern corresponding to a first task and at least indirectly identifies one or more first sub-application programs of one or more second application programs that are relevant to the first task, and the method further comprises:

defining a second pattern corresponding to a second task performable on a computing system, the second pattern at least indirectly identifying one or more second sub-application programs of one or more second application programs that can be run on the computing system and that are relevant to the second task;

applying the second pattern, by the processor, to the plurality of sub-application programs of the plurality of application programs currently running on the computing system to identify a second working set of one or more sub-application programs of one or more application programs currently running on the computing system that are relevant to the second task; and, hiding, by the processor, (a) the plurality of sub-application programs of the plurality of application programs currently running on the computing system that are not part of the second working set, and (b) the plurality of application programs currently running on the computing system that do not include any sub-application program that is part of the second working set, within a graphical user interface presented by the computing system.

10. A computing system comprising:
a processor;
a computer-readable data storage medium to store:
an operating system executable by the processor to provide a graphical user interface;
a plurality of sub-application programs of a plurality of application programs executable by the processor;
a computer program executable by the processor to:
apply a pattern corresponding to a task performable on the computing system to the plurality of sub-application programs of the application programs currently running on the computing system, to identify a working set of one or more sub-application programs of one or more application programs currently running on the computing system that are relevant to the task;
hide within the graphical user interface, (a) the plurality of sub-application programs of the plurality of application programs currently running on the computing system that are not part of the working set, and (b) the plurality of application programs currently running on the computing system that do not include any sub-application program that is part of the working set; and responsive to a user interacting with the graphical user interface to switch among the sub-application programs currently running on the computing system, switch among the sub-application programs that are part of the working set, wherein the pattern is to at least indirectly identify one or more sub-application programs of one or more application programs that can be run on the computing system and that are relevant to the task, and wherein a given application program of the one or more application programs includes a first sub-application program relevant to the task and a second sub-application program not relevant to the task, the processor hiding the second sub-application program of the given application program but not the first sub-application program of the given application program.

11. The computing system of claim 10, wherein each sub-application program corresponds to one or more of:
a separately and currently open tab of a window of a corresponding application program;
a separately and currently open window of a corresponding application program;
a separately and currently open document of a corresponding application program;
a separately and currently open file of a corresponding application program;
a separately and currently open item of a corresponding application program.

12. The computing system of claim 10, wherein the computer program is further to:
receive a specification of the pattern from a user, without the user specifying the working set itself.

13. The computing system of claim 10, wherein the computer program is further to:
analyze utilization of the sub-application programs and the application programs that one or more of are running and have been running on the computing system to identify a proposed pattern that is relevant to the task;
permit refinement of the proposed pattern, by the user, to generate the pattern from the proposed pattern.

14. The computing system of claim 10, wherein the graphical user interface comprises a region in which the plurality of application programs currently running on the computing system are identified by graphical elements,
and wherein the computer program is to hide the plurality of sub-application programs that are not part of the working set and the plurality of application programs that do not include any sub-application program that is part of the working set by:
hiding the graphical elements for the application programs that do not include any sub-application program that is part of the working set.

15. The computing system of claim 10, wherein the graphical user interface comprises a region in which the plurality of application programs currently running on the computing system are identified by graphical elements,
and wherein the computer program is to hide the plurality of sub-application programs that are not part of the working set and the plurality of application programs that do not include any sub-application program that is part of the working set by:
hiding the graphical elements for the sub-application programs that are not part of the working set.

16. The computing system of claim 10, wherein the pattern is a first pattern corresponding to a first task and at least indirectly identifies one or more first sub-application programs of one or more second application programs that are relevant to the first task, and the computer program is further to:

apply a second pattern corresponding to a second task to the working set to identify a sub-working set of the working set of the one or more sub-application programs of the one or more application programs currently running on the computing system that are relevant to both the second task in addition to being relevant to the second task;

hide within the graphical user interface, (a) the plurality of sub-application programs of the plurality of application programs currently running on the computing system that are not part of the sub-working set, and (b) the plurality of application programs currently running on the computing system that do not include any sub-application program that is part of the sub-working set, wherein the second pattern is to at least indirectly identify one or more second sub-application programs of one or more second application programs that can be run on the computing system and that are relevant to the second task.

17. The computing system of claim 10, wherein the working set is a first working set, the pattern is a first pattern corresponding to a first task and at least indirectly identifies one or more first sub-application programs of one or more second application programs that are relevant to the first task, and the computer program is further to:

apply a second pattern corresponding to the task to the plurality of sub-application programs of the plurality of application programs currently running on the computing system to identify a second working set of one or more sub-application programs of one or more application programs currently running on the computing system that are relevant to the second task; and, hide within the graphical user interface, (a) the plurality of sub-application programs of the plurality of application programs currently running on the computing system that are not part of the second working set, and (b) the plurality of application programs currently running on the computing system that do not include any sub-application program that is part of the second working set, wherein the second pattern is to at least indirectly identify one or more second sub-application programs of one or more second application programs that can be run on the computing system and that are relevant to the second task.

18. A computer program product comprising:

a computer-readable storage medium having computer-readable code embodied therein, the computer-readable code executable by a processor of a computing system on which an operating system is providing a graphical user interface, the computer-readable code comprising:

first computer-readable code to apply a pattern corresponding to a task performable on the computing system to a plurality of sub-application programs of the application programs currently running a the computing system, to identify a working set of one or more sub-application programs of one or more application programs currently running on the computing system that are relevant to the task;

second computer-readable code to hide within the graphical user interface, (a) the plurality of sub-application programs of the plurality of application programs currently running on the computing system that are not part of the working set, and (b) the plurality of application programs currently running on the computing system that do not include any sub-application program that is part of the working set; and third computer-readable code to responsive to a user interacting with the graphical user interface to switch among the sub-application programs currently running on the computing system, switch among the sub-application programs that are part of the working set, wherein the pattern is to at least indirectly identify one or more sub-application programs of one or more application programs that can be run on the computing system and that are relevant to the task, and wherein a given application program of the one or more application programs includes a first sub-application program relevant to the task and a second sub-application program not relevant to the task, the processor hiding the second sub-application program of the given application program but not the first sub-application program of the given application program.

* * * * *